Patented June 13, 1950

2,511,018

UNITED STATES PATENT OFFICE 2,511,018

VAT DYES OF THE ANTHRAQUINONE 1,3,4-OXDIAZOLE SERIES

Frederic B. Stilmar, Wilmington, Del., assignor to E. I. du Pont de Nemours & Company, Wilmington, Del., a corporation of Delaware No Drawing. Application March 15, 1949, Serial No. 81,619

4 Claims. (Cl. 260—307.5)

This invention relates to the preparation of new dyes of the anthraquinone series, and more particularly to the preparation of anthraquinone oxdiazoles which dye cotton from the usual hydrosulfite vats in red shades.

The anthraquinone vat dyes are known to be of particular value because of their excellent fastness properties, and, while a large range of colors has been produced commercially, there has not been produced a red dye in this class which will dye in the bright shades desirable and have the good fastness properties of dyes of this class in general. Several red dyes have been produced in the anthraquinone series, but they lack the strength or brightness or certain fastness properties which are particularly desirable and which usually identify the dyes of this class.

It is an object of the present invention to produce new vat dyes of the anthraquinone series which dye in relatively bright red shades and which exhibit excellent fastness properties and high tinctorial strength. A more specific object of the invention is to produce oxdiazoles of the anthraquinone series by effecting ring closure of the acylated hydrazines produced by condensing 1-amino- or 1-nitroanthraquinone-2-carbonyl hydrazines with organic dicarboxylic acid chlorides.

The acylated hydrazines which are employed as the starting intermediates for producing the dyes of the present invention are more particularly disclosed and claimed in my co-pending application Serial No. 81,618 filed of even date herewith. These acylated hydrazines have the general formula:

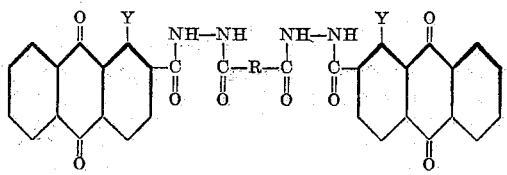

and are produced by reacting 1-amino- or 1-nitroanthraquinone-2-carbonyl hydrazine with an organic dicarboxylic acid chloride of the formula:

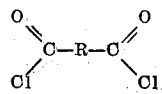

In the above formulae, Y stands for a substituent of the group consisting of —NH₂ and —NO₂, and R stands for a radical of the group consisting of the otherwise unsubstituted benzene, naphthalene, diphenyl and terphenyl radicals, and of the benzene, naphthalene, diphenyl and terphenyl radicals containing from 1 to 4 halogen atoms consisting of chlorine and bromine.

In producing the compounds of the present invention, the acylated hydrazines of the above formula are subjected to a ring closure reaction which is brought about by the aid of acid condensing agents such as thionyl chloride, phosphorus oxychloride, p-toluene sulfonic acid, etc. In this reaction the hydrazide groups are ring closed to the oxdiazoles to give compounds of the general formula:

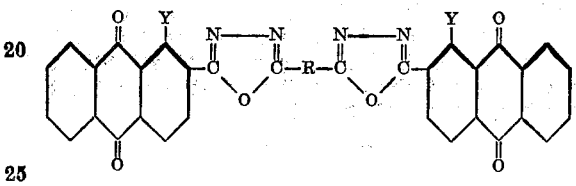

in which R and Y have the same significance as above given. The ring closure reaction is preferably carried out at temperatures of from 160° to 175° C., although higher or lower temperatures such as from 130° to 210° C. may be employed, depending upon the particular acid condensing agent used. The ring closure is preferably effected in an inert organic solvent such as the aromatic hydrocarbons or their nitrated or chlorinated derivatives, of which nitrobenzene, o-dichlorobenzene, trichlorobenzene and alpha-chloronaphthalene, are illustrative.

The following examples are given to illustrate the invention. The parts used are by weight.

Example 1

Thirty-one (31) parts of 1-nitroanthraquinone-2-carbonyl hydrazine, 10 parts of terephthalyl chloride and 800 parts of nitrobenzene are heated to 165°–170° C. for two hours, or until the evolution of hydrogen chloride is complete. The colorless product is filtered off, washed with benzene and dried. Twenty (20) parts of this acylated 1-nitroanthraquinone - 2 - carbonyl hydrazine, 40 parts of thionyl chloride and 400 parts of nitrobenzene are heated to reflux (160°–170° C.) for six hours.

The resulting product, which is in the form of compact crystals, is filtered off at 90° C. and washed with benzene and dried. It is a colorless product with a melting point over 400° C., and is represented by the formula:

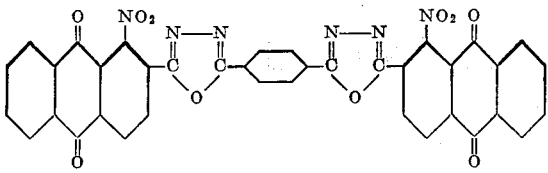

The ring closure may also be effected with thionyl chloride in other high boiling inert solvents such as o-dichlorobenzene, trichlorobenzene and alpha-chloronapthhalene.

Upon vatting the above dinitro compound with sodium hydrosulfite and caustic soda, a brown-red vat is obtained from which cotton is dyed bright red shades of excellent fastness properties.

The nitro group may also be replaced by the amino group by suspending the oxdiazole compound as above obtained in 10 to 20 parts of nitrobenzene and passing ammonia through the suspension at 170°–200° C. Red, crystalline needles of the corresponding dyestuff are formed. This diamino-oxdiazole compound has the formula:

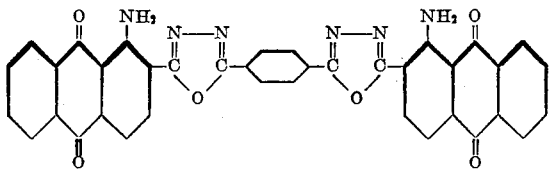

It is insoluble in the usual organic solvents and dissolves in concentrated sulfuric acid with a very weak yellow color. The product dyes cotton in red shades from a brown-red vat, as described above for the dinitro compound. The brilliant color obtained shows excellent fastness to light and high tinctorial strength.

Example 2

Five (5) parts of the acylated 1-nitroanthraquinone-2-carbonyl hydrazine (as produced in Example 1), 3 parts of p-toluene sulfonic acid and 130 parts of trichlorobenzene are heated at 200°–210° C. for eight hours. The resulting dinitro-oxdiazole may be converted to the corresponding diamino-oxdiazole, as described in Example 1, by vatting or by treating with ammonia at 180° C. in an inert solvent as already described.

Example 3

Five (5) parts of isophthalic acid is converted to the acid chloride by heating with 250 parts of trichlorobenzene and 10 parts of thionyl chloride under reflux at 150° C. until solution is complete; then the excess thionyl chloride is removed by air blowing. To the resulting solution 20.5 parts of 1-nitroanthraquinone-2-carbonyl hydrazine are added and the temperature maintained at 165°–170° C. for four hours. The resulting product is filtered off, washed with benzene and dried. Ten (10) parts of this acylated 1-nitroanthraquinone-2-carbonyl hydrazine, 15 parts of thionyl chloride and 200 parts of trichlorobenzene are heated at reflux (165°–175° C.) for six hours.

The resulting colorless crystalline dinitro product is filtered off, washed with benzene and dried. The product dyes cotton in red shades from a brown-red vat, somewhat bluer than the product of Example 1. It dissolves in sulfuric acid with a very pale color.

The diamine form of this dyestuff may be formed alternately by passing ammonia through a suspension of the dinitro-oxdiazole in nitrobenzene as described in Example 1.

Example 4

Five and four-tenths (5.4) parts of naphthalene-1,4-dicarboxylic acid is converted to the acid chloride by heating with 10 parts of thionyl chloride and 200 parts of nitrobenzene at 150° to 155° C. for four hours. The excess thionyl chloride is removed by air blowing and 17 parts of 1-nitroanthraquinone-2-carbonyl hydrazine are added. After heating at 160°–165° C. for several hours, the resulting almost colorless particles are filtered off, washed with benzene and dried. Fourteen (14) parts of this acylated 1-nitroanthraquinone-2-carbonyl hydrazine, 30 parts of thionyl chloride and 300 parts of nitrobenzene are heated at reflux (165°–170° C.) for six hours. The resulting product is filtered off, washed with benzene and dried. This dinitro-oxdiazole gives a brown-red vat from which cotton is dyed in red shades, and has the formula:

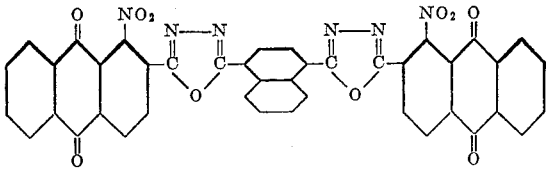

During the vatting the nitro compound is reduced to the corresponding amine. When treated with ammonia as described in Example 1, the diamino compound is also obtained.

Example 5

Five (5) parts of diphenyl-4,4'-dicarboxylic acid is converted to the acid chloride by heating with 10 parts of thionyl chloride and 200 parts of nitrobenzene at 145° C. for ten hours. By that time solution is complete and the excess thionyl chloride is removed by air blowing.

Twelve and three-tenths (12.3) parts of 1-nitroanthraquinone-2-carbonyl hydrazine are added to the solution, and after heating at 160°–170° C. for several hours the resulting product as microscopic needles is isolated by filtration, washed with benzene and dried. Five (5) parts of this acylated 1-nitroanthraquinone-2-carbonyl hydrazine, 15 parts of thionyl chloride and 200 parts of nitrobenzene are heated at reflux (170°–175° C.) for eight hours. The resulting colorless dinitro-oxdiazole, in the form of compact needles, is filtered off, washed with benzene and dried. It dissolves in sulfuric acid with a pale straw color and dyes cellulose fibers in bluish-red shades of excellent strength and fastness properties from an alkaline hydrosulfite vat. During the vatting process it is converted to the diamino compound.

The replacement of the nitro groups by the amino groups is readily effected by passing ammonia through the nitrobenzene suspension of the dinitro-oxdiazole. The dyestuff separates as red needles and dyes cotton in the same red shades from a brown-red vat as the corresponding dinitro compound. It has the formula:

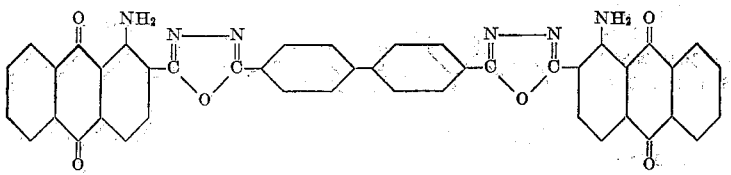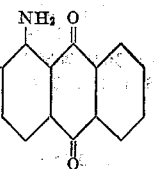

When p-terphenyl-4,4''-dicarboxylic acid is employed in the above example in place of the diphenyl-dicarboxylic acid, a similar dinitro- and diamino-oxdiazole dye is obtained in which the oxdiazole groups are linked through the terphenyl radical. This product dyes in red shades and exhibits good fastness properties.

*Example 6*

Ten (10) parts of chloroterephthalic acid is converted into the dicarbonyl chloride by refluxing with 25 parts of thionyl chloride, 400 parts of o-dichlorobenzene and ½ part of pyridine at 130°–140° C. for three hours. The excess thionyl chloride is removed by a current of air, and there is added 34.1 parts of 1-nitroanthraquinone-2-carbonyl hydrazine. After heating at reflux temperatures (160°–170° C.) for two hours, 45 parts of thionyl chloride are added at the reflux temperature, and this temperature is maintained for six hours. The oxdiazole of the following formula crystallizes out as short, rather thick needles.

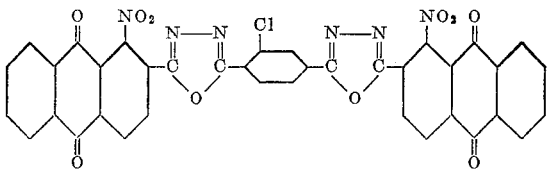

The corresponding diamine results by passing ammonia through the nitrobenzene suspension at 180°–190° C.

The resulting product dyes in strong bright red shades from a wine colored alkaline hydrosulfite vat. It dissolves in sulfuric acid with a very weak yellow color.

*Example 7*

Three and four-tenths (3.4) parts of tetrachloroterephthalyl chloride, 7 parts of 1-nitroanthraquinone-2-carbonyl hydrazine and 150 parts of ortho-dichlorobenzene are slowly heated to reflux (160°–170° C.) and the temperature maintained for two hours. Then there is added under reflux 15 parts of thionyl chloride. The acylated hydrazine gradually ring closes to the oxdiazole. After refluxing for ten hours, the product, as uniform white needles, is filtered off, washed and dried. Chlorine found: 14.1%; theory: 14.6%. It has the formula:

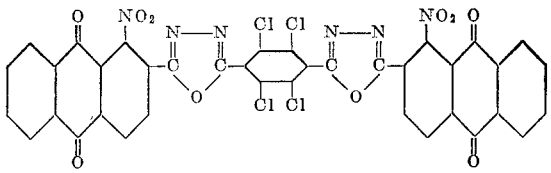

This product dissolves in sulfuric acid solution with a pale straw color. It dyes cotton in bright red shades from a brown-red alkaline hydrosulfite vat. The nitro groups are reduced to amino groups during the vatting operation.

The nitro groups may also be replaced by amino groups by passing ammonia through a nitrobenzene suspension of the above oxdiazole at 180° C.

In a similar manner to that illustrated in the above examples, the other acylated 1-nitro- or 1 - aminoanthraquinone - 2 - carbonyl hydrazine, more particularly disclosed in my co-pending application Serial No. 81,618, may be ring closed to the oxdiazoles, forming very desirable red dyes having exceptional tinctorial strength and fastness properties. As further illustrative of the particular acylated anthraquinone-carbonyl hydrazines that may be converted to dyes of the present invention are those produced by condensing 1-nitro- or 1-aminoanthraquinone-2-carbonyl hydrazine with any of the following halogen substituted dicarboxylic acid chlorides:

5,8-dichloronaphthalene - 1,4 - dicarboxylic acid chloride 4,8-dichloronaphthalene - 1,5 - dicarboxylic acid chloride 4,4'-dichlorobiphenyl-3,3'-dicarboxylic acid chloride 3,3'-dichlorobiphenyl-4,4'-dicarboxylic acid chloride 5-bromonaphthalene-1,4-dicarboxylic acid chloride 5-bromobenzene-1,3-dicarboxylic acid chloride, and Bromoterephthalic acid chloride.

It will be obvious that only those dicarboxylic acids or acid chlorides can be employed which do not form cyclic imides with hydrazines. In other words, the terephthalyl chloride, the isophthalyl chloride and their chloro or bromo derivatives, the 1,3-, 1,4-, 1,5-, 1,6- or 1,7-naphthalene dicarboxylic acids, and any of the diphenyl and terphenyl dicarboxylic acids which have the carboxylic acid groups separated by at least three carbon atoms if they are both on the same benzene ring, or separated by at least 5 carbon atoms if they are on different benzene rings in the molecule, may be employed. In other words, the o-benzene dicarboxylic acid, the naphthalene-1,8-dicarboxylic acid and the 2,2'-diphenyl or the 2,2'-terphenyl dicarboxylic acid which form cyclic imides with hydrazines, are not satisfactory for producing the compounds of the present invention.

As illustrated in the above examples, acylated anthraquinone-carbonyl hydrazines may be ring closed without isolation from the nitrobenzene or other solvent in which they are formed by adding the acid condensing agent and continuing the heating at ring closure temperatures, generally within the range of from 130° to 210° C.

Where the dinitro-oxdiazole compound is obtained, it may be employed directly in the dyeing or printing process, for during the vatting step it is reduced to the corresponding amine. In most cases, however, the nitro groups may be replaced by the amino groups through amination either with ammonia in an organic solvent at elevated temperatures or with ammonium hydroxide under pressure at temperatures of from 120° to 200° C. These new vat dyes may be purified, when found desirable, by recrystallization from sulfuric acid or by treatment with oxidizing agent such as sodium dichromate in aqueous sulfuric acid suspensions.

The dyes of this invention all dye cellulose fibers from the usual alkaline hydrosulfite vat in red-to-scarlet shades of good to excellent general fastness properties. They exhibit exceptionally high tinctorial strength and may be employed in either the dyeing or printing processes by which the anthraquinone vat dyes are ordinarily applied to textile fibers.

I claim:

1. The anthraquinone oxdiazole compounds of the general formula:

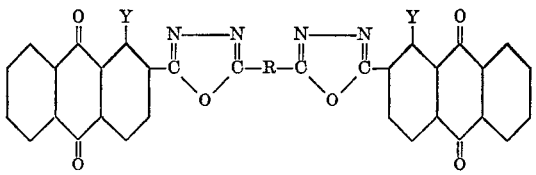

in which Y stands for a substituent of the group consisting of —NH₂ and —NO₂ and R stands for a radical of the group consisting of the benzene, naphthalene, diphenyl and terphenyl radicals and their halogen derivatives which contain from 1 to 4 halogen atoms of the group consisting of chlorine and bromine.

2. The anthraquinone oxdiazole compound of the formula:

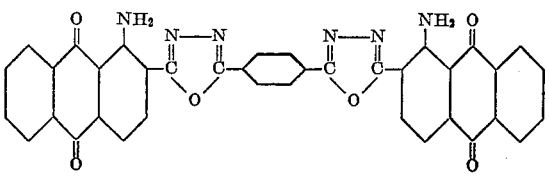

3. The anthraquinone oxdiazole compound of the formula:

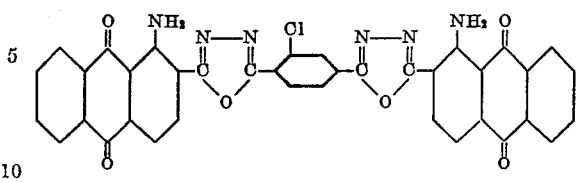

4. The anthraquinone oxdiazole compound of the formula:

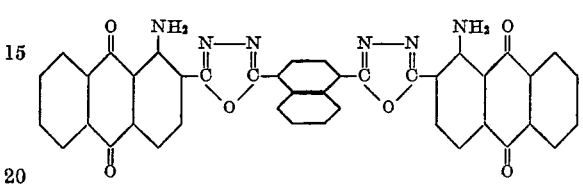

FREDERIC B. STILMAR.

REFERENCES CITED

The following references are of record in the file of this patent:

UNITED STATES PATENTS

| Number | Name | Date |
|---|---|---|
| 2,464,831 | Stilmar | Mar. 22, 1949 |